Dec. 6, 1966 H. L. METZ 3,289,374
WALL REPAIR DEVICE
Filed July 3, 1963 5 Sheets-Sheet 1

Inventor
Henry L. Metz
By Wallace, Kinzer and Dorn
Attorneys

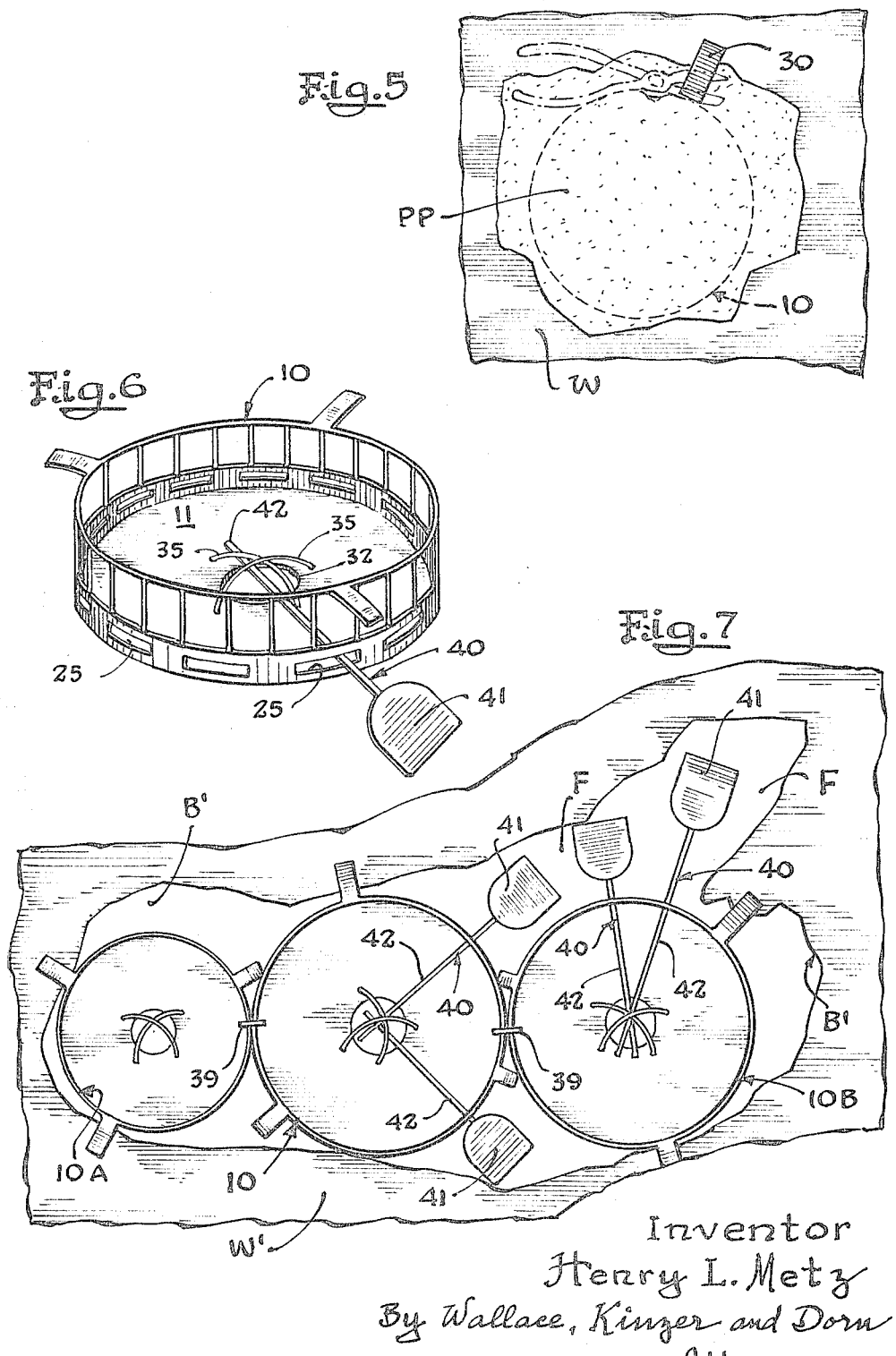

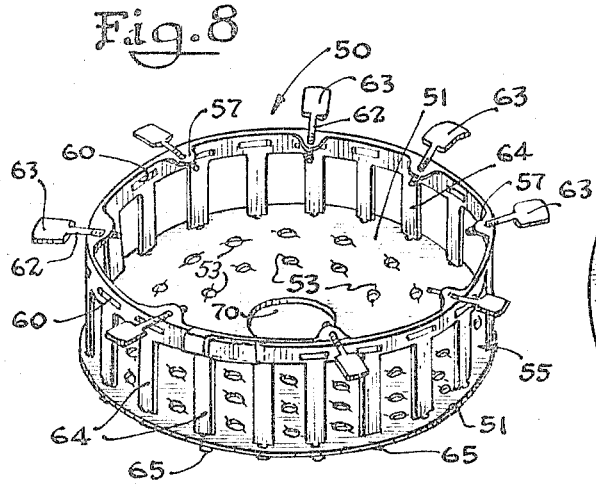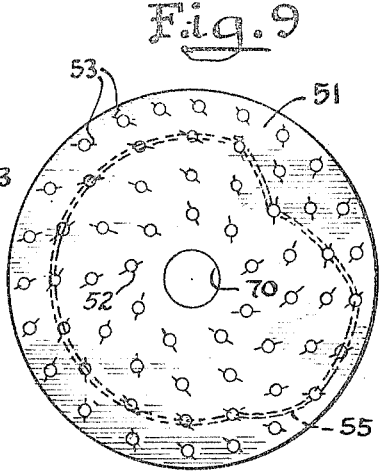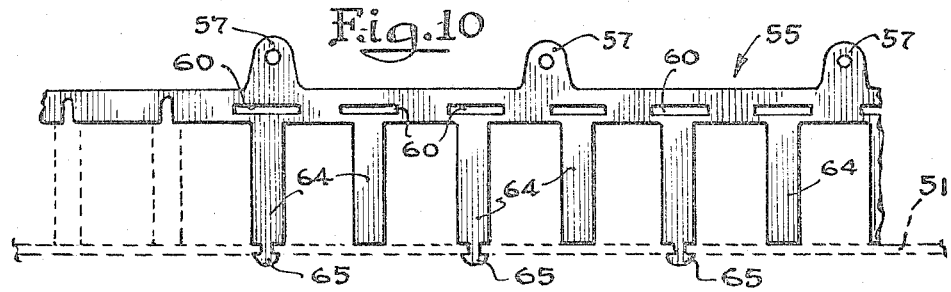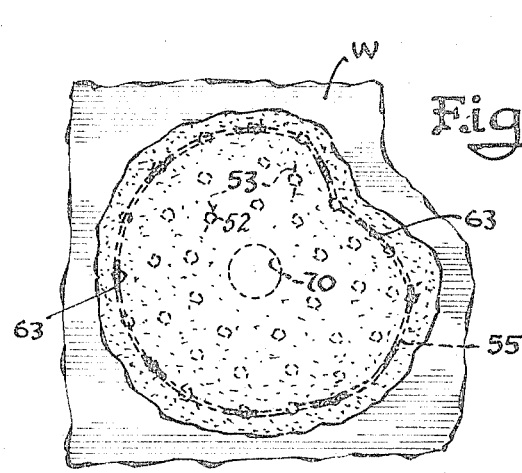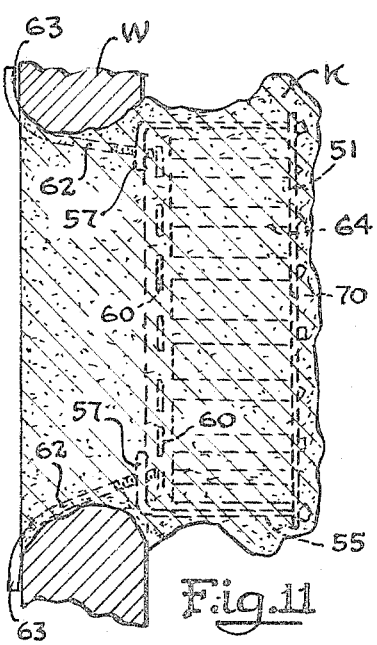

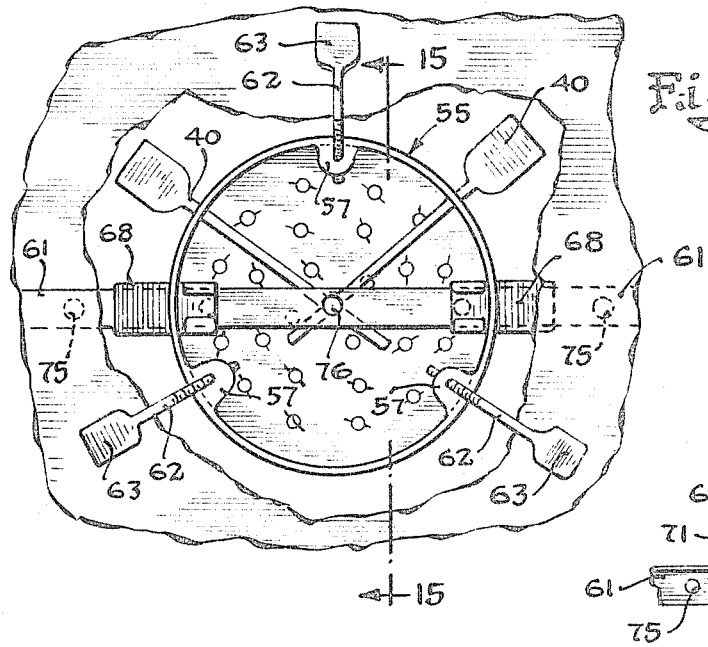
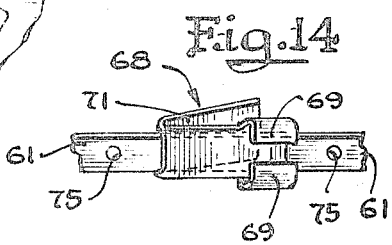
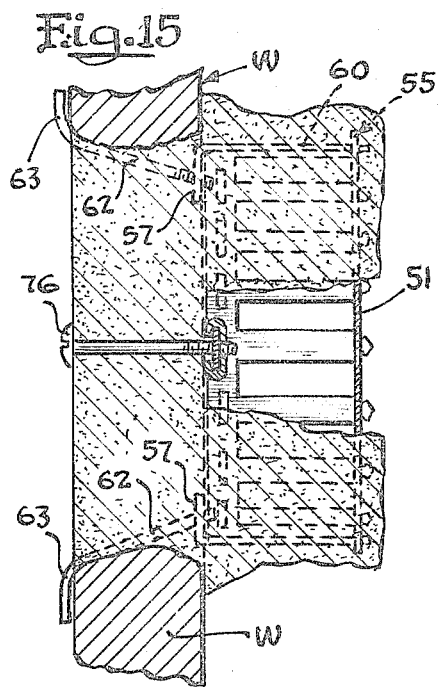
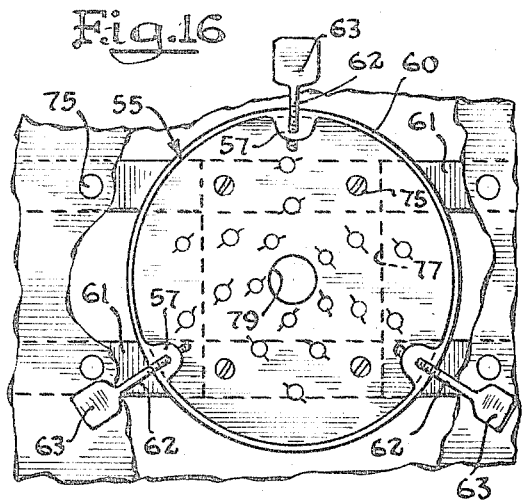

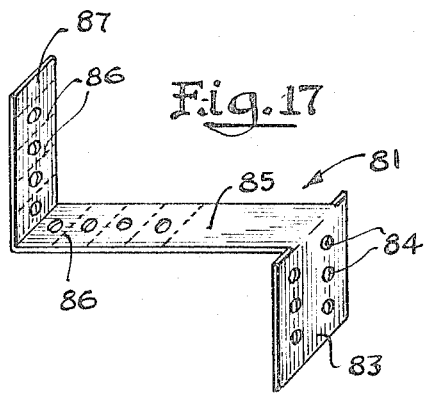
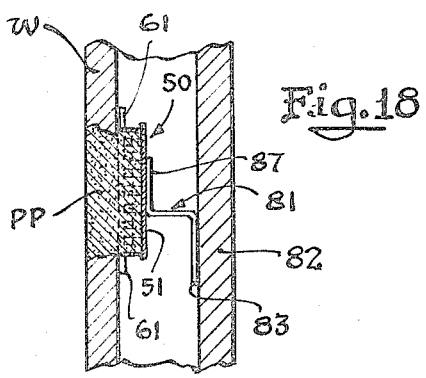
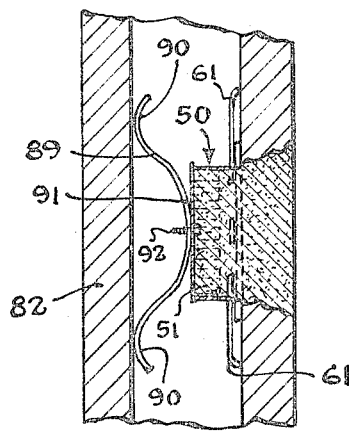
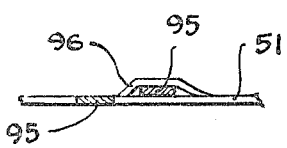
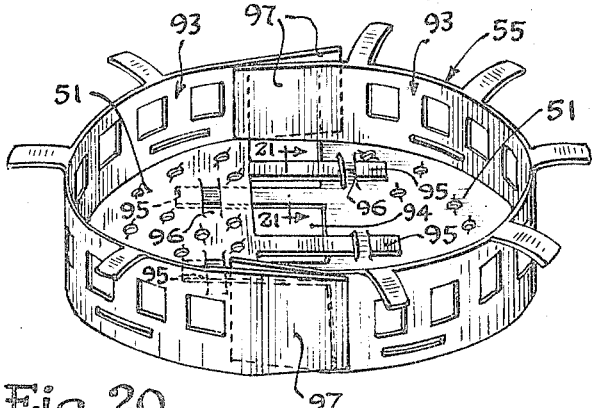

United States Patent Office 3,289,374
Patented Dec. 6, 1966

3,289,374
WALL REPAIR DEVICE
Henry L. Metz, 21401 Edgecliff Drive, Cleveland, Ohio
Filed July 3, 1963, Ser. No. 293,923
11 Claims. (Cl. 52—514)

This application is a continuation in part of application Serial No. 250,817, filed January 11, 1963, now abandoned.

This invention relates to an insert for repairing breaks in plaster type walls and the like, and in particular one that is box-like in nature and so constructed as to enable patching plaster pressed therein to extrude outward at the rear surface of the wall thereby to establish a key between the wall and the patch.

In the instance of so-called wallboard for home construction, it is quite easy to break an opening in the wall. Such hollow breaks are ordinarily repaired by applying patching plaster thereto. However, and particularly in the instance of relatively large breaks, it is not possible to support the patch properly during the time the break is being filled with patching plaster, and this is due to the inability to obtain proper back-stopping of the patch material in the hollow area. Under the present invention, this difficulty is overcome, and such constitutes the main object of the present invention, by affording a box-like insert or container adapted to be located in the hollow break, the insert being box-like in nature and perforated so that patching material pressed into the cavity presented thereby will be extruded radially outward at the rear surface of the wall into contact with the back of the wall thereby to achieve a reinforced plaster key with the back of the repaired wall.

Specifically, the insert includes a base plate that will be located at the rear surface of the wall, when the insert is positioned in the break, and a side wall projecting from the base plate is provided with openings through which patching plaster, inherently reinforced by the side wall of the insert, will extrude thereby to key against the rear surface of the repaired wall. Additionally, the insert includes a rim that will be located at the front of the wall to be repaired, and easily removable tongues or stops project therefrom to engage the front of the wall thereby to hold the insert in place during the time that the patching plaster is being applied.

In addition to facilitating repairing hollow breaks of the ordinary kind, an object of the present invention is to facilitate creation of a plug of plaster where a screw or nail with adhering fragments of material is torn from the wall, enabling the screw or nail to be replaced when the patched plug has set.

For installations where the opening in the plaster board is of irregular shape and for ease of packaging and assembly, a knockdown kit for on the site assembly will be most advantageous, and to make such a kit available is another object of the present invention, and in particular one which makes it possible to readily assemble an insert conforming closely to the approximate irregular break or opening in the wall board and thereby afford more adequate support for the plaster patch. One embodiment of the knockdown kit form of insert has a pair of half-sectors which are readily movable relative to one another and therefore displays more flexibility in comparison to a fixed base plate.

Additionally there are times when it is desired to support a fixture or ornament from the area of a wall where there is a break. For such occasions, an insert is provided under the present invention with a supporting bar engageable with the wall about the break to more firmly hold the insert in place and to spread the weight of the ornament being supported about the wall surrounding the break.

While the insert may be situated within the break in the wall, as above described, it is deemed preferable to have the insert spaced rearwardly of the opening in the wall so as to provide a larger amount of plaster material for keying purposes, and so to do is another object of the present invention. To support the insert adjacent the rear surface of the wall having a break, one form of the invention found to be satisfactory employs a riser bar which is secured by a suitable adhesive to the surface of a reverse and opposing wall and wherein the insert is adhered to another portion of the riser and immediately adjacent the rear surface of the break in the wall.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 5 is a view illustrating one of the final stages of repair;

FIG. 6 is a perspective view of the insert equipped with an auxiliary or lath extension;

FIG. 7 is a view illustrating the manner in which the auxiliary extensions associated with the inserts are utilized;

FIG. 8 is a perspective view of a knockdown embodiment of an insert constructed under and in accordance with the present invention;

FIG. 9 is a perspective view of the base plate showing, in dotted lines, a possible configuration for a flexible side wall strip;

FIG. 10 is an enlarged fragmentary view of a portion of the flexible side wall strip according to the preferred embodiment of the invention;

FIG. 11 is a sectional view of a wall showing the alternate embodiment insert and the patching plaster keyed to the wall prior to the removal of the tabs according to the present invention;

FIG. 12 is a front view of the wall showing FIG. 11 with the tabs removed;

FIG. 13 is a front view illustrating an embodiment of the present invention employing a supporting bar and a pair of wedges carried by a supporting bar;

FIG. 14 is a perspective view of a portion of the supporting bar and a wedge carried thereon according to the preferred embodiment of the invention;

FIG. 15 is a sectional view showing a wall and the plaster key therein with a section broken away to show the attachment of an anchor to a supporting bar;

FIG. 16 is a front view showing an insert provided with a pair of supporting bars and an anchoring plate secured to the bars within the insert;

FIG. 17 is a perspective view showing a riser plate bent into a configuration for supporting an insert and for attaching to a wall.

FIG. 18 is a sectional view of a riser plate secured to an opposed wall and supporting an insert adjacent the rear surface of the wall having the opening therein;

FIG. 19 is a sectional view showing spring clip biasing an insert into position adjacent the rear surface of the opening in the wall.

FIG. 20 is another embodiment of the invention showing an insert composed of a pair of substantially identical halves expandable relative to one another.

FIG. 21 is a sectional view taken along the line 21—21 in FIG. 20 in the direction of the arrows showing the bars from each of the split halves inserted through an opening in the opposed split half.

Figure 1:
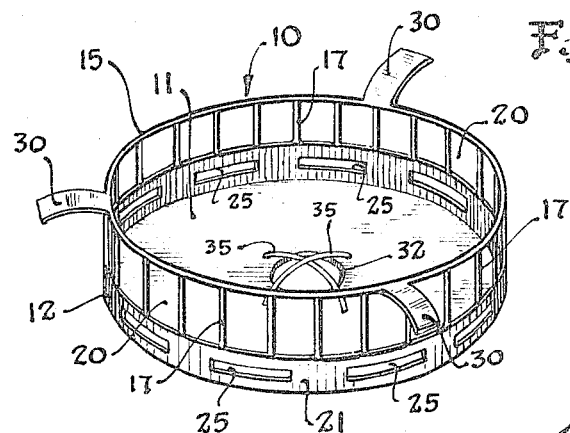
FIG. 1 is a perspective view of an insert constructed under and in accordance with the present invention.

One form of patching insert contemplated under the present invention is illustrated in FIG. 1 in the form of a boxlike device 10 which includes a base plate 11 at the back thereof and a perforated side wall 12 projecting therefrom. The insert 10 is generally circular in appearance, but it will be appreciated from the description to follow that this particular form is one of convenience, and in fact, a rectangular construction could be utilized as well.

The front side of the insert 10, opposite the base plate 11, is defined by a peripheral bead or rim 15 joined to the side wall 12 by a plurality of wire-like connectors 17 that are spaced one from another to afford a plurality of relatively large openings 20 that extend about the side wall 21. The openings 20 are elongated in directions normal to the base plate 11. The connectors 17 are joined to an annular section 21 of the side wall that has spaced elongated slots 25 formed thereabout for a purpose to be described hereinafter. The slots 25 are elongated in a circumferential direction.

The front bead 15 is provided with a plurality of flexible tongues or wire-like stops 30, and when the insert is located in the hollow break of a wall as hereinafter described, the tongues or stops 30 are adapted to bear against the front face of the wall thereby to limit the extent to which the insert 10 is movable into the hollow break. Under this circumstance, the base plate 11 is extended to the rear face of the wall having the hollow break therein to be patched, and to such an extent as to present the openings 20 to the rear face of the wall for the purpose hereinafter explained.

An opening 32 is formed in the center of the base plate 11. This opening permits a plug of keying plaster to extrude therethrough. A pair of spring-like arches 35 are secured to the base plate 11 in any desired fashion and are crossed over and above the opening 32 to enable auxiliary extensions, serving as lath, to be selectively related to the patching insert in the manner hereinafter described.

The insert above described can be formed of a molded plastic, or fabricated from wire and sheet metal.

Figure 2:
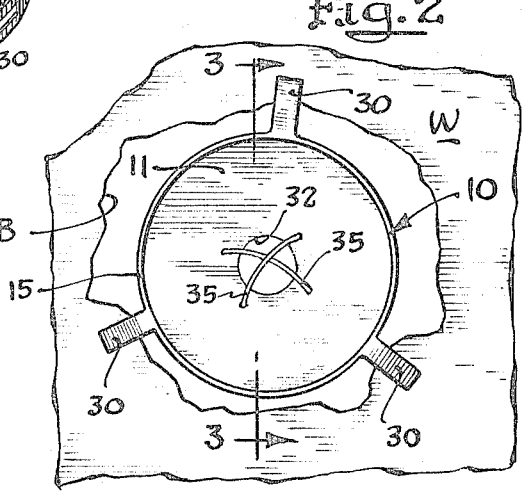
FIG. 2 is a view illustrating the first step in using the insert of the present invention to repair a hollow break in a wall.
Figure 3:
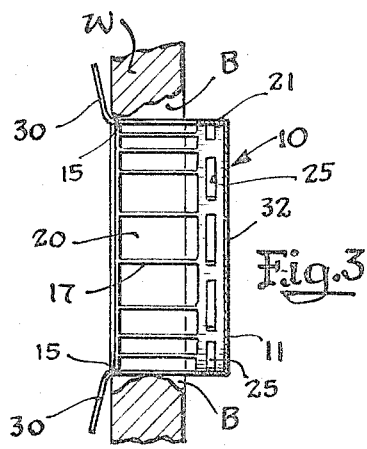
FIG. 3 is a sectional view taken substantially on the line 3—3 of FIG. 2.

In FIG. 2 is shown a section of a wall W having a hollow break B therein that is to be repaired by patching plaster applied thereto. In accomplishing such repair, the first step in accordance with the present invention is to position a selected insert as 10 in the break with the tabs or stops 30 engaging the marginal portion of the wall surrounding the break at the front face of the wall W, as shown in FIGS. 2 and 3. In this connection, it may be observed that the tabs 30 are preferably spaced at 120° intervals about the rim 15 and project at an angle of about 10° relative to the plane defined by the rim 15 so that when the tabs are in place as shown in FIG. 3, the insert 10 as a whole is in effect submerged in the break B. Under this circumstance, the base plate 11 is extended beyond the plane of the rear face of the wall W so that at least the bottoms of the openings 20 are exposed to the rear face of the wall W.

It will be appreciated that inserts of the present invention can be furnished in variant sizes insofar as area may be concerned, as well as geometrically, as noted above. Thus, as will be shown in more detail hereinafter, it may be necessary to use a plurality of inserts as 10, but of different size, positioned in a relatively large break of quite variant area itself. Moreover, the inserts can be furnished in different standards so far as wall thickness is concerned.

Figure 3A:
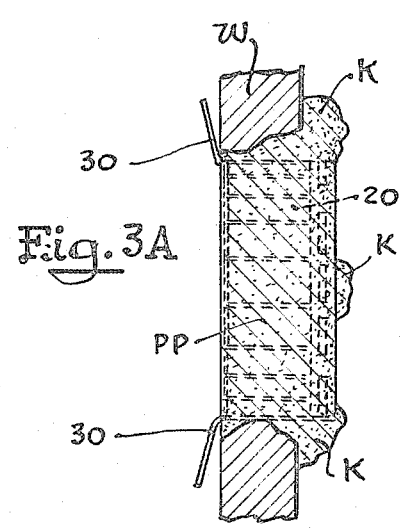
FIG. 3A is a view on the line 3A—3A of FIG. 4 illustrating the manner in which the present invention accounts for supporting keying plaster at the rear surface of the wall being repaired.
Figure 4:
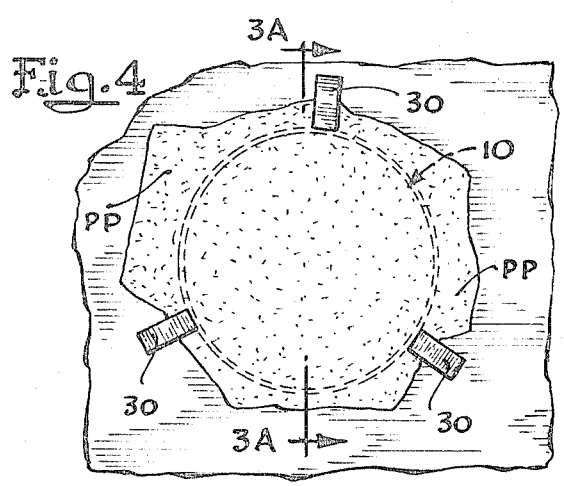
FIG. 4 is a plan view of the patched hole.

After the insert has been positioned in the hollow break that is to be repaired, and in the manner described above, patching plaster PP, FIGS. 3A and 4, of optimum consistency from the standpoint of plastic flow is then pressed into the cavity presented by the open end of the insert opposite the base plate 11. When doing this, and as the insert cavity is filled, patching plaster will extrude through the center opening 32 and radially outward through the openings 20 to afford back-stop keys K at the rear face of the wall W, as shown in FIG. 3A. Of course, the patching plaster also extrudes outward through the openings in the side wall 12 to contact the inner periphery of the hole B.

Thus it will be seen that the openings 20 in particular produce extrusion of the patching plaster outward into contact with the rear face of the wall being repaired, thereby to assure retention of the patch as a whole, and at the same time the connectors 17 constitute reinforcement for the keyed patching material. Of course, the openings 25 also participate in the formation of the patching key at the rear face of the wall being repaired, but these openings in addition have another and quite distinct function, as explained below.

After the break has been completely filled, as shown in FIG. 5, the patching material is preferably allowed to set before the stops are snipped off. Removal of the stops will be facilitated if they are provided with weakening score lines or the like. Any surface defacements resulting from removal of the stops can be filled in with putty or original patching material.

Referring to FIG. 7, the break B' in the wall W' is of irregular geometry and of quite large size such as to absorb three inserts 10, 10A and 10B themselves of different size, subscribing to whatever standards may be determined upon for optimum home use. The inserts 10, 10A and 10B are connected to one another in any desired fashion, as by wires or clips 39. Even so, there remains a jagged fissure F, of such nature and extent that a patching insert is not of practical use in repairing the fissure. However, this circumstance is easily accommodated by projecting into the fissure auxiliary lath extension 40 anchored to the base plate of the insert most conveniently located with respect to the fissure F.

As shown in FIGS. 6 and 7, each lath extension 40 includes a blade or pallet end 41 extended outward of the related insert as 10 with which it is associated, and a rod-like attaching element 42 of such length and dimension as to be inserted through a slot 25 under the arch-like grippers 35 to be retained thereby with the auxiliary extension as a whole radiating from the side wall. It will be recognized from FIG. 7 that the extensions 40 are easily positionable circumferentially of the associated insert to occupy strategic positions within the fissure F that is to receive patching plaster. The pallet end of each auxiliary extension is capable of supporting and reinforcing plastic patching material applied thereto.

The insert 10 shown in FIG. 1 is of a preformed type of insert having a circular patch and is best suited for nearly circular openings although the lath extensions 40 make its use possible in openings of other configurations as apparent from FIG. 7. However, when a non-circular opening is present, it is preferred to employ a knockdown or kit type of insert 50 as shown in FIG. 8 since the insert can be constructed to closely approximate the configuration of the irregular shaped fissure in the wall. The insert 50 has a base plate 51 with a plurality of concentric rings of circular apertures 52 each of which is intersected by slots 53 cut in the base plate material. Each aperture 52 and its slot 53 constitutes an anchoring or securing type of connecting means for a side wall 55 as will be described hereinafter.

The side wall 55 is supplied in the form of a coil strip which when uncoiled will be in the form shown in FIG. 3. The side wall 55 is preferably of a flexible material such as a thin walled metal strip or thin walled plastic strip tht is easily bendable to conform to the configuration of an opening such as that shown in dotted line form in FIG. 12. The flexible strip forming the side wall 55 has a plurality of tab members 57 which are capable of being turned normal to the side wall 55 and into the interior of the insert for receiving the threaded end 62 of a front stop member 63 in a circular opening 64 formed in the center of the tab members 57. The front stops 63 serve the same purpose as the front stops or tabs 30 for the insert 10, i.e., to engage the front surface of the wall receiving the plaster plug.

The upper rim portion of the side wall 15 is provided with a series of spaced rectangular slots 60 through which plaster can be extruded for engagement with the rear surface of the wall W or through which can be inserted a supporting plate 61 for engaging the rear surface of the wall W adjacent the opening so that the insert 50 is held in position between the front stop 63 and the supporting bar 61.

When making the insert 50 shown in FIG. 8, the side wall 55 is roughly conformed to the opening within the wall board and then the connectors 64 are positioned with their bayonet ends 65 extending through the receiving slots 53 formed in the base plate 51. Manifestly, if not all of the coil strip is needed, the strip can be severed and the excess can be employed elsewhere. Also if desired, any portions of the base plate 51 extending exteriorly of the side wall 55 can be severed from the base plate 51 so that the base plate 51 also appoximately conforms to the opening within the wall and can be easily inserted through the opening.

To more securely anchor the side wall 55 to the base plate 51, the bayonet portions 65 of the connectors 64 can be twisted relative to the slots 53 after having been inserted therethrough to interlock in a positive manner the side wall 55 to the base plate 51.

Thus, it should be apparent that after construction of the insert 50 in desired shape, it then can be placed within the opening in the wall board and the front stops 63 bent flush with the front surface of the wall W. Plaster is then placed in the insert 50 in the manner herein described in connection with the insert 10. The base plate 51 is shown with a central aperture 70 through which the plaster may extrude and to form a key K for securing the plaster plug to the base plate 51 in a similar manner as the keys K formed through the openings between the connectors 64 keys the plaster insert to the side walls 51. After the insert 50 has been filled with plaster and the outer surface of the plaster board is made smooth and flush with the outer surface of the wall W, the ends of the front stops 63 extending outwardly of the wall are removed and a final finishing and smoothing operation can be accomplished.

In the embodiment shown in FIG. 13, the supporting bar 61 is inserted through a pair of opposed slots 60 in a side wall 55 and a pair of slidable spring wedges 68 are slidably mounted on the bar 61 for movement into engagement with the rear surface of the wall W so as to urge the bar 61 rearwardly and thereby through the side wall 55 urge the front stop members 63 into tight clamping engagement with the front surface of the wall W.

More specifically, the spring wedges 68 are shown in FIG. 14 as having a pair of bent ears 69 clasped about the bar 61 to provide a slot through which extends the bar 61. The spring wedges 68 have an incline wedging portion 71 bent upwardly from the ears 69 and extending upwardly and outwardly from the bar 61. Preferably, the spring wedges 68 are made from spring steel and when the wedging portion 71 is positioned between the bar 61 and the rear surface of the wall W, the spring wedges 68 exert a force on the support bar 61 tending to urge the insert 50 rearwardly and thereby assure that the front stop members 63 are in firm engagement with the outer surface of the wall W.

As previously explained, the insert 10 can be provided with lath extensions 40 and in a similar manner the insert 50 can be provided with lath extensions 40 which are inserted between the supporting bar 61 and the base plate 51 rather than beneath the pair of arches 35 shown in the embodiment in FIGS. 6 and 7.

As shown in FIGS. 14 and 16, the supporting bar 61 is provided with a plurality of spaced and tapped holes 75 through which can be threaded an anchor member 76, FIG. 15. As seen in FIG. 15, the anchor member 76 can be used to support the weight of a heavy object since the supporting bar 61 is of sufficient strength to carry a heavy load and since it extends for a sufficient distance beyond the opening in the wall to spread the load thereon over a substantial area of the wall surrounding the plaster patch and thus relieving the patching plaster plug from having a pulling force inserted thereon tending to pull the plaster plug from the open as would be the case in the absence of a supporting bar 61.

For further distributing the load and thereby enabling the support of larger elements, a pair of supporting bars 61, FIG. 16, are employed and a support plate 77 is secured therebetween by suitable fasteners 48 threaded in the holes 75. With such an arrangement the load is more effectively distributed over a larger area and a larger supporting aperture 79 is provided for securing a large anchor member. In lieu of the tab members 30 for engagement with the front surface of the wall W when using the insert 10, and in lieu of the front stop members 63 when using the insert 50 shown in FIG. 8, it is proposed to employ a riser member 81 which can be suitably attached to an opposed or reverse wall 82, which together with the wall W constitutes the usual type room divider wall having separate plaster wall surfaces on each side of the room wall. The riser 81 is shown in an enlarged form in FIG. 17 and is shown as having a plurality of apertures 84 in a base 83 over which base an adhesive is applied prior to being pressed against the reverse wall 82. As is shown in FIG. 17, the riser 81 has a leg 85 having a series of scored lines 86 thereon which permits the leg 87 to be easily bent along a scored line to form at right angles to the leg 85 an insert supporting portion 87 appropriately spaced from the reverse wall 82 so that the insert is properly positioned with its outer surface adjacent the rear surface of the wall W, FIG. 18. As shown in FIG. 18, the insert 50 has a load supporting bar 61 against the rear surface of the wall W and the plaster plug PP is keyed to the insert 50 and to the wall W.

The insert 50 shown in FIG. 18 may be attached by different types of risers 81. For example, in FIG. 19 there is shown a riser in the form of a spring clip 89. The spring clip 89 is of a bowed construction with a pair of spaced ends 90 in engagement with the reverse wall 82 and a central portion 91 bearing against the base plate 51 of an insert 50, the insert 50 being secured by a suitable threaded fastener 92 to central portion 91 of the spring clip 89. As shown in FIG. 19, a load spreader bar 61 may be employed to hold the insert 50 against the outward thrust through the opening in the wall under the urging of the spring clip 89. Risers of other configuration have been employed, such as, for example, a riser having a suction cup.

The embodiment of the plaster supporting insert shown in FIG. 20 is particularly useful in large rectangular shaped openings such as those in a masonry or tile wall composed of rectangular blocks since the two halves 93 of the insert can be expanded or moved relatively apart from one another to almost completely fill a rectangular opening. To secure the insert halves 93 together, each of the base plate sections 51 of the insert half 93 has projecting therefrom a pair of extension bars 95 which can be inserted in punched out members 96 forming an opening with the base plate 51 through which an extension bar 95 on opposed insert half 93 can be inserted. The punched out members 96 in one insert half 93 extend upwardly from the base plate 51 whereas the punched out members 96 on the opposed insert half 93 extend downwardly from the base plate 51 so that the extension bars 95 from one half are disposed above the base plate 51 on the opposed half and its extension bars 95 are disposed through the members 96 on the underside of the opposed half 93. The insert halves 93 each have an end portion 97 on their side walls 55 extending outwardly from the edge of the base and the insert half 93 to overlap the opposed side wall extension 97 on the opposite half when the insert halves 93 are closely adjacent to one another. When the insert halves 93 are moved apart, the overlapping side wall extensions 97 constitute an expandable side wall to contain the plaster within the insert halves 93. The central gap 94 is first covered by a piece of expanded metal or other suitable material (not shown) to prevent the plaster from falling therethrough when the gap 94 is of sufficiently large dimensions to warrant covering.

The use of the expandable insert having a pair of mating halves such as the insert half 93 should be readily apparent for other installations than rectangular openings wherein it is desired to have a long and fairly extensive plaster supporting insert.

In view of the foregoing, it should be apparent that there has been provided a readily assembled insert that is conformable into the approximate configuration of the opening in a wall and which also may have a supporting base that not only serves to hold the insert in position within the opening in the wall board but also which may serve as a supporting bar to which can be attached a heavy load.

It will be recognized from the foregoing that the present invention makes it possible to easily perform patching repairs on plasterboard walls or the like, irrespective of the size of the hollow break that is entailed in the repair work, this being accomplished by so constructing a patching insert with a perforate wall of novel form as to cause the patching plaster to extrude outward at the rear face of the wall to thereby establish a keying contact with the rear face of the wall. In the event of fissures or other narrow finger-like breaks, or pockets of a size too small for an ordinary insert, it is merely necessary to associate a lath extension with the insert. In this connection it will be appreciated that the blade ends 41 may, in fact, be unnecessary or, in any event, can be of variant form. Advantageously, a deformable plastic is used for the elements herein described, particularly the attaching element 42 so as to enable the same to be bent to dispose the pallet 41 in a plane most efficacious for the patching job. It may be finally observed that openings, if desired, may be provided in the tabs 30 to enable small nails or screws to be set therein and driven into the solid wall surrounding the break, thereby to positively position the insert. Alternatively, placement of any convenient piece of wood, metal, plastic, etc. through selected openings 20 and/or 25, effective to wedge the insert at the back of the wall will also serve such purpose. Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A patching insert for repairing hollow breaks in plaster-type walls and the like and comprising an open-ended generally box-like member of a size to be inserted in the break, said member including at the other end thereof a base plate adapted to be located at the rear face of the wall having the break when said member is inserted in the break, a side wall projecting from the base plate and forming a tubular member and defining an open-ended cavity into which the patching material is to be pressed, said side wall terminating opposite the base plate in a rim to be located at the front face of the wall having the break, elongated tongues of bendable material radiating from said rim, said tongues being bendable to extend at substantially right angles to said rim and for engagement with the front of the wall having the break to be repaired, and said side wall having unobstructed openings for enabling plaster to be extruded therethrough for keying to key around the rear surface of the wall having the break therein.

2. An insert according to claim 1 wherein the openings in the side wall include openings that are elongated in directions normal to the plane of the base plate.

3. An insert according to claim 2 wherein the openings in the side wall include openings elongated in directions normal to the other elongated openings.

4. A readily assembled insert for insertion into a hole in a plaster wall to hold patching plaster and to shape the plaster whereby the patching plaster is keyed to the plaster wall, said insert comprising:
 (a) a base means,
 (b) a plurality of connecting means in said base,
 (c) a flexible side wall strip means having openings therethrough and forming a tubular member with inner and outer opposed edges defining a predetermined shape,
 (d) connecting means on said inner edge of said flexible side wall strip means forming a tubular member connecting said strip means to said base means and holding said flexible strip means in said predetermined shape on said base means, and
 (e) holding means extending from said side wall strip means adjacent said outer edge thereof and being bendable to engage the surrounding edges of the wall to hold said insert against movement as the patching plaster is forced into said insert.

5. The insert of claim 4, wherein said side wall strip means has slots located along the outer edge of side wall strip means for reception of a bar for engagement with the rear surface of the plaster wall adjacent the opening in the wall.

6. The insert of claim 5 wherein said holding means includes a plurality of integrally formed tabs on said outer edge of said side wall strip means, each of said tabs being bendable and having an aperture therein, and said holding means including a plurality of bendable front stop means having one end securable to a tab through the aperture therein and the other end bendable to engage the surrounding edge of the wall.

7. A patching insert for repairing hollow breaks in plaster type walls and the like and comprising an open ended generally box-like member of a size to be inserted in the break, said member including:
 (a) a base plate,
 (b) a flexible side wall strip means formable into a predetermined shape approximating the shape of the break, said side wall strip means being secured to said base and cooperating with said side wall strip means to constitute said box-like member, said side wall strip means terminating opposite the rear surface of the wall in a rim having a plurality of spaced apertures therein, (c) a supporting bar means extending through said apertures in said rim and extending laterally outward of said rim in a direction transverse to said rim for engagement with the rear surface of the wall adjacent the break, (d) tongues radiating from said rim and serving as stops engageable with the front surface of the wall having the break to be repaired whereby said bar and said tongues hold the open end of said box-like member adjacent the rear surface of said wall.

8. A patching insert for repairing hollow breaks in plaster type walls and the like, said insert comprising an open-ended generally box-like member of a size to be inserted in the break, said insert comprising, (a) a pair of substantially identical insert halves relatively movable to one another, (b) each of said insert halves having a base plate and a side wall projecting from the base plate to define an open-ended cavity into which the patching material is to be placed, (c) each of said side walls extending outwardly of said base plate and each having a side wall extension for telescoping with the side wall of the opposite insert halves when said insert halves are located adjacent one another, (d) each of said insert halves having bars extending outwardly from its respective insert half for engagement with its opposite insert half, (e) each of said insert halves having receiving means for the bars of its opposite insert half, whereby the insert halves are held together to form expandable box-like member, and (f) means for securing said insert adjacent the opening in said hollow break in a wall whereby the plaster material can be inserted into the insert and into the break in the wall, said side walls having openings therein for extruding plaster therethrough to key plaster with said plaster walls.

9. The insert according to claim 1 including elongated members extending outwardly from said base beyond the periphery of said tubular member for engagement with the rear face of said side wall.

10. In combination with a box-like insert for holding plaster for repairing a hole in one wall of a room wall having a pair of opposed front and rear walls, said insert having a base and a continuous upstanding wall for receiving plaster or the like, said upstanding wall having apertures therein for extruding plaster therethrough, a holding riser means for attachment to an opposed rear wall and for positioning said box-like insert adjacent a break in a front wall which is to receive a plaster patch, said holding riser means being connected, at one portion thereof, to said insert by a first securing means, a second securing means on another portion of said riser means for securing said holding riser means to said rear wall whereby said box-like insert is positioned adjacent the opening in said wall, said holding riser means having a spring element for urging said insert into the break in said wall, and additional means attached to and extending transversely of said insert for engaging the rear surface of the front wall to hold the insert in place.

11. In combination, a box-like insert, patching material filling said insert, and a room wall having a pair of opposed front and rear walls, said front wall having a break therein for receiving said insert, said front wall having front and rear surfaces, said insert having a base and a continuous upstanding tubular wall, said upstanding wall having apertures therein with patching material extruded therethrough into contact with the rear surface of the front wall and extending about the break in the front wall, a holding riser means for attachment to the opposed rear wall and for positioning said box-like insert adjacent the break in the front wall, a first securing means connecting said holding riser means, at one portion thereof, to said insert, a second adhesive securing means securing said holding riser means, at a second portion thereof, to said rear wall, and additional means attached to and extending transversely of said box-like insert and engaging the rear surface of the front wall to hold the insert against movement through said break in the wall.

References Cited by the Examiner

UNITED STATES PATENTS

| | | | |
|---|---|---|---|
| 721,534 | 2/1903 | Blair | 52—421 |
| 1,316,297 | 9/1919 | Gold | 52—127 X |
| 1,837,930 | 12/1931 | Waite | 52—708 X |
| 1,850,276 | 3/1932 | Zifferer | 52—708 |
| 1,966,167 | 7/1934 | Denk | 52—698 |
| 2,013,736 | 9/1935 | Stirrup | 52—421 |
| 2,101,001 | 11/1937 | Balduf | 52—573 X |
| 2,512,188 | 6/1950 | Wait et al. | 248—205 |
| 2,598,194 | 5/1952 | Shippey | 52—514 |
| 2,638,774 | 5/1953 | Wieman | 52—514 |
| 2,849,866 | 9/1958 | Flygare et al. | 52—698 X |
| 2,930,199 | 3/1960 | Jarund | 52—744 X |
| 2,946,157 | 7/1960 | Franz et al. | 52—704 X |
| 2,952,099 | 9/1960 | Futterer | 52—698 |

FOREIGN PATENTS

| | | |
|---|---|---|
| 107,999 | 7/1937 | Australia. |
| 218,646 | 2/1925 | Great Britain. |

FRANK L. ABBOTT, *Primary Examiner.*

A. C. PERHAM, *Assistant Examiner.*